(12) United States Patent
Seith et al.

(10) Patent No.: US 9,017,209 B1
(45) Date of Patent: Apr. 28, 2015

(54) POWER TOOLS WITH REVERSIBLE, SELF-SHIFTING TRANSMISSION

(71) Applicant: Ingersoll-Rand Company, Davidson, NC (US)

(72) Inventors: Warren Andrew Seith, Bethlehem, PA (US); Aaron Michael Crescenti, Glen Gardner, NJ (US)

(73) Assignee: Ingersoll-Rand Company, Davidson, NC (US)

( * ) Notice: Subject to any disclaimer, the term of this patent is extended or adjusted under 35 U.S.C. 154(b) by 18 days.

(21) Appl. No.: 14/144,863

(22) Filed: Dec. 31, 2013

(51) Int. Cl.
| | |
|---|---|
| *F16H 3/44* | (2006.01) |
| *B25F 5/00* | (2006.01) |
| *F16D 43/16* | (2006.01) |
| *F16H 37/04* | (2006.01) |
| *F16D 43/30* | (2006.01) |
| *F16H 61/02* | (2006.01) |

(52) U.S. Cl.
CPC *B25F 5/001* (2013.01); *F16H 3/44* (2013.01); *F16D 43/16* (2013.01); *F16H 2200/0034* (2013.01); *F16H 2200/0086* (2013.01); *F16H 2200/2005* (2013.01); *F16H 37/046* (2013.01); *F16D 43/30* (2013.01); *F16H 61/0293* (2013.01)

(58) Field of Classification Search
CPC ......... B25F 5/001; B23Q 5/10; B23B 45/008; F16H 3/44; F16H 39/046; F16H 61/0293; F16D 47/04; F16D 43/02; F16D 43/30
USPC ........ 192/48.92; 475/208, 209, 266, 257, 297
See application file for complete search history.

(56) References Cited

U.S. PATENT DOCUMENTS

| | | | | |
|---|---|---|---|---|
| 4,364,286 | A | * 12/1982 | Ciolli | ............................ 475/270 |
| 4,648,756 | A | 3/1987 | Alexander et al. | |
| 5,011,341 | A | 4/1991 | DeGroff | |
| 5,025,902 | A | 6/1991 | Imai et al. | |
| 5,307,911 | A | 5/1994 | Robinson | |
| 5,399,129 | A | * 3/1995 | Ciolli | ............................ 475/301 |
| 5,573,472 | A | 11/1996 | Ciolli | |
| 5,730,232 | A | * 3/1998 | Mixer | ............................ 173/176 |
| 5,738,177 | A | 4/1998 | Schell et al. | |
| 5,897,454 | A | 4/1999 | Cannaliato | |

(Continued)

FOREIGN PATENT DOCUMENTS

EP          0173482 A1       3/1986

OTHER PUBLICATIONS

Atlas Copco Industrial Technique AB, "LTP 61 Shut-off Nutrunner," May 19, 2008, 14 pages.

(Continued)

*Primary Examiner* — Roger Pang
(74) *Attorney, Agent, or Firm* — Barnes & Thornburg LLP (57) ABSTRACT

Illustrative embodiments of power tools with reversible, self-shifting transmissions are disclosed. In at least one illustrative embodiment, a power tool may comprise a motor having a motor shaft, an output shaft configured to be coupled to a tool element to rotate a fastener, and a transmission coupled between the motor shaft and the output shaft to transmit rotation from the motor shaft to the output shaft in a low-speed, high-torque mode and in a high-speed, low-torque mode. The transmission may be configured to self-shift between the low-speed, high-torque mode and the high-speed, low-torque mode in response to a change in a torque required to rotate the output shaft in both a clockwise direction and a counterclockwise direction.

20 Claims, 5 Drawing Sheets

(56) References Cited

U.S. PATENT DOCUMENTS

| | | | |
|---|---|---|---|
| 5,971,123 | A | 10/1999 | Ochab et al. |
| 5,992,592 | A | 11/1999 | Showalter |
| 5,996,758 | A | 12/1999 | Baxter, Jr. |
| 6,026,942 | A | 2/2000 | Saiko et al. |
| 6,092,634 | A | 7/2000 | Kremer et al. |
| 6,093,128 | A | 7/2000 | Seith |
| 6,165,096 | A * | 12/2000 | Seith ............................ 475/265 |
| 6,176,359 | B1 | 1/2001 | Krisher |
| 6,343,900 | B1 | 2/2002 | Bruno |
| 6,588,559 | B2 | 7/2003 | Blair |
| 6,622,837 | B2 | 9/2003 | Ochab et al. |
| 6,629,590 | B2 | 10/2003 | Ochab et al. |
| 6,655,515 | B2 | 12/2003 | Cox et al. |
| 6,722,484 | B2 | 4/2004 | Ochab et al. |
| 6,739,440 | B1 | 5/2004 | Dick |
| 7,513,845 | B2 | 4/2009 | Ho |
| 7,588,112 | B2 | 9/2009 | Ebihara |
| 7,882,766 | B2 * | 2/2011 | Kiyosawa ....................... 74/640 |
| 7,938,041 | B1 | 5/2011 | Shiigi et al. |
| 8,303,449 | B2 | 11/2012 | Ho et al. |
| 2002/0096343 | A1 | 7/2002 | Potter et al. |
| 2002/0130007 | A1 * | 9/2002 | Nakamura et al. .............. 192/38 |
| 2003/0104900 | A1 * | 6/2003 | Takahashi et al. ................ 477/3 |
| 2006/0234822 | A1 | 10/2006 | Morscheck et al. |
| 2009/0277658 | A1 | 11/2009 | Chen |
| 2010/0064831 | A1 | 3/2010 | Lee et al. |
| 2011/0030980 | A1 | 2/2011 | Ho |
| 2011/0099993 | A1 | 5/2011 | Ishii et al. |
| 2011/0180290 | A1 | 7/2011 | Kondo |
| 2011/0203821 | A1 | 8/2011 | Puzio et al. |
| 2012/0231921 | A1 * | 9/2012 | Phillips ........................ 475/297 |
| 2012/0231924 | A1 | 9/2012 | Monteiro De Lima |
| 2013/0248313 | A1 * | 9/2013 | Rubino ........................ 192/43.1 |

OTHER PUBLICATIONS

Atlas Copco Industrial Technique AB, "Atlas Copco LMP/LTP Nutrunners," Sep. 2009, 6 pages.

American Assembly Tools, Inc., "Manufacturer of Pneumatic & Electric Nutrunners for Industrial Assembly," Jan. 2006, 34 pages.

\* cited by examiner

POWER TOOLS WITH REVERSIBLE, SELF-SHIFTING TRANSMISSION

TECHNICAL FIELD

The present disclosure relates, generally, to power tools and, more particularly, to power tools having a transmission that is self-shifting between a low-speed, high-torque mode and a high-speed, low-torque mode in both a clockwise and a counterclockwise direction.

BACKGROUND

Power tools may be used to install and/or remove fasteners such as, for example, bolts, nuts, screws, and the like. When installing a fastener, it is often required that the fastener first be run down, or rotated for numerous revolutions, until the fastener engages a workpiece. Thereafter, the fastener must typically be rotated a further number of revolutions at progressively higher torque until a desired final torque is achieved. Conversely, when removing a fastener, a higher torque is initially needed to loosen the fastener from the workpiece, after which numerous revolutions (at lower torque) are needed to fully remove the fastener from the workpiece.

By using a power tool that has a high output speed, a fastener can be run down quickly. However, the power tool will typically not develop sufficient output torque to tighten the fastener to the desired final torque. On the other hand, while a tool configured to generate high output torque may sufficiently tighten a fastener to the desired final torque, it will have a lower speed of operation, resulting in a long run down time. As such, valuable time may often be lost during the installation of fasteners, due to either the long run down time associated with using a high torque tool or the need to switch between tools for the different phases of installing each fastener. It will be appreciated that similar considerations are applicable in the selection of the tool(s) used for removing fasteners.

SUMMARY

According to one aspect, a power tool may comprise a motor having a motor shaft, an output shaft configured to be coupled to a fastener to rotate the fastener, and a transmission coupled between the motor shaft and the output shaft to transmit rotation from the motor shaft to the output shaft in a low-speed, high-torque mode and in a high-speed, low-torque mode. The transmission may be configured to self-shift between the low-speed, high-torque mode and the high-speed, low-torque mode in response to a change in a torque required to rotate the output shaft in both a clockwise direction and a counterclockwise direction.

In some embodiments, the transmission may comprise a speed adjuster coupled to the motor shaft, a speed-sensitive clutch coupled to the motor shaft, and a bi-directional overrunning clutch coupled between the speed adjuster and the output shaft. The bi-directional overrunning clutch may also be coupled between the speed-sensitive clutch and the output shaft. The transmission may be configured such that, when the transmission is in the high-speed, low-torque mode, the speed-sensitive clutch couples to the bi-directional overrunning clutch to transfer rotation from the motor shaft to the bi-directional overrunning clutch for rotation therewith.

In some embodiments, the speed-sensitive clutch may be a centrifugal clutch. The centrifugal clutch may be configured to overcome a biasing force when rotating above a threshold speed to couple to the bi-directional overrunning clutch. The speed adjuster may be configured to reduce a speed of rotation transferred from the motor shaft to the bi-directional overrunning clutch. The speed adjuster may be a speed-reducing planetary gear set.

In some embodiments, the bi-directional overrunning clutch may comprise an outer race coupled to the speed adjuster, an inner race coupled to the speed-sensitive clutch, and an engagement assembly located in a space defined radially between the outer race and the inner race. The engagement assembly may be configured to selectively (i) connect the inner race to the outer race for rotation therewith or (ii) disconnect the inner race from the outer race so that the inner race can overrun the outer race when the inner race rotates faster than the outer race. The output shaft may be coupled to the inner race for rotation therewith. The outer race may be formed to define an outer race cavity that houses the speed-sensitive clutch. The motor shaft, the outer race, the inner race, and the output shaft may each rotate about a common axis.

According to another aspect, a power tool transmission may comprise an output shaft, a centrifugal clutch, a speed-reduction gear set, and a bi-directional overrunning clutch coupled between the centrifugal clutch and the output shaft and coupled between the speed-reduction gear set and the output shaft.

In some embodiments, the bi-directional overrunning clutch may comprise an outer race coupled to an output of the speed-reduction gear set, an inner race coupled to an output of the centrifugal clutch, and an engagement assembly located in a space defined radially between the outer race and the inner race. The engagement assembly may be movable between an unlocked position, in which the inner race is free to move relative to the outer race in both a clockwise direction and a counterclockwise direction, and a locked position, in which the engagement assembly is wedged between the outer race and the inner race to couple the outer race to the inner race for rotation therewith in both the clockwise direction and the counterclockwise direction.

In some embodiments, the output shaft may be coupled to the inner race for rotation therewith. The engagement assembly may comprise a first biasing shoe frictionally engaged with the outer race and a first plurality of locking members configured to move with the first biasing shoe within the space between an unlocked position, in which the first plurality of locking members are free to move relative to the outer race and the inner race, and a locked position, in which the first plurality of locking members are wedged between the outer race and the inner race to couple the outer race to the inner race for rotation therewith. The engagement assembly may further comprise a second biasing shoe frictionally engaged with the outer race and a second plurality of locking members configured to move with the second biasing shoe within the space between an unlocked position, in which the second plurality of locking members are free to move relative to the outer race and the inner race, and a locked position, in which the second plurality of locking members are wedged between the outer race and the inner race to couple the outer race to the inner race for rotation therewith. The first plurality of locking members may be a plurality of rollers.

BRIEF DESCRIPTIONS OF THE DRAWINGS

The invention described herein is illustrated by way of example and not by way of limitation in the accompanying figures. For simplicity and clarity of illustration, elements illustrated in the figures are not necessarily drawn to scale.

For example, the dimensions of some elements may be exaggerated relative to other elements for clarity. Further, where considered appropriate, reference labels have been repeated among the figures to indicate corresponding or analogous elements. The detailed description particularly refers to the accompanying figures in which.

DETAILED DESCRIPTION

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the present disclosure.

Figure 1:
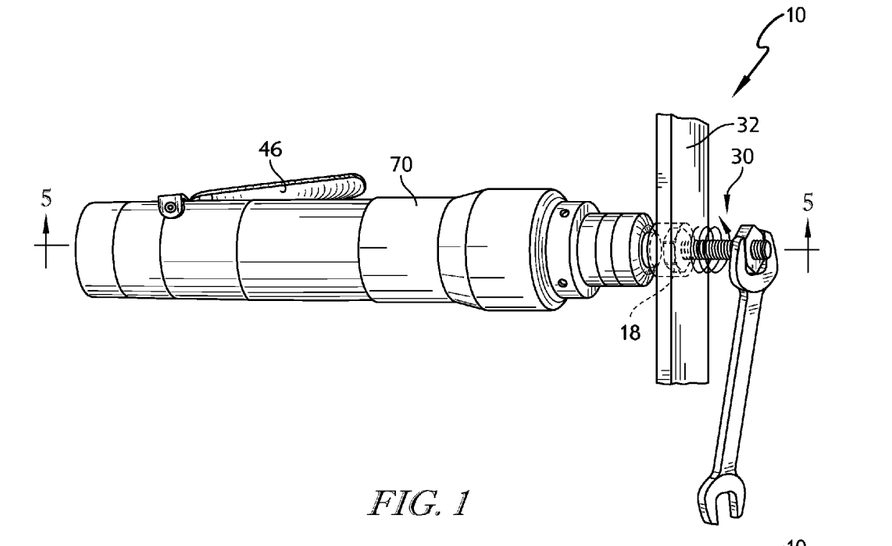
FIG. 1 is a perspective view of one illustrative embodiment of a power tool installing a fastener while operating in a high-speed, low-torque mode.

Referring now to FIG. 1, one illustrative embodiment of a power tool 10 configured to automatically self-shift between a high-speed, low-torque mode and a low-speed, high-torque mode, in both clockwise and counterclockwise directions of operation, is shown. The power tool 10 is operable to install a fastener 30 (illustratively shown as a bolt and a nut) to a workpiece 32. As described further below (see, e.g., FIGS. 3 and 4), the power tool 10 includes a motor 12, an output shaft 14, and a transmission 16 configured to transfer rotation from the motor 12 to the output shaft 14. The output shaft 14 is configured to couple to the fastener 30 to rotate the fastener 30. In the illustrative embodiment, the output shaft 14 is configured to do so by coupling to a tool element 18 that engages the fastener 30 and transfers the rotation of the output shaft 14 to the fastener 30. The tool element 18 may be one of a plurality of differently-sized tool elements 18 that may be interchangeably coupled to the output shaft 14 for engaging differently-sized fasteners 30. By way of illustrative example, the tool element 18 may be, a socket (as shown in FIGS. 1 and 2), a bit, or any other device capable of engaging the fastener 30.

When installing the fastener 30 to the workpiece 32, the fastener 30 may need to be run down, or rotated numerous times, before the fastener 30 engages the workpiece 32. During such a run down phase (illustrative shown in FIG. 1), a lower torque is required to rotate the fastener 30. Once the fastener 30 engages the workpiece 32, the fastener 30 may need to be rotated at a higher torque (i.e., greater than the lower torque required during the run down phase) until a desired final torque is achieved. During this tightening phase, the higher torque required may progressively increase as the fastener 30 approaches the desired final torque.

Figure 2:
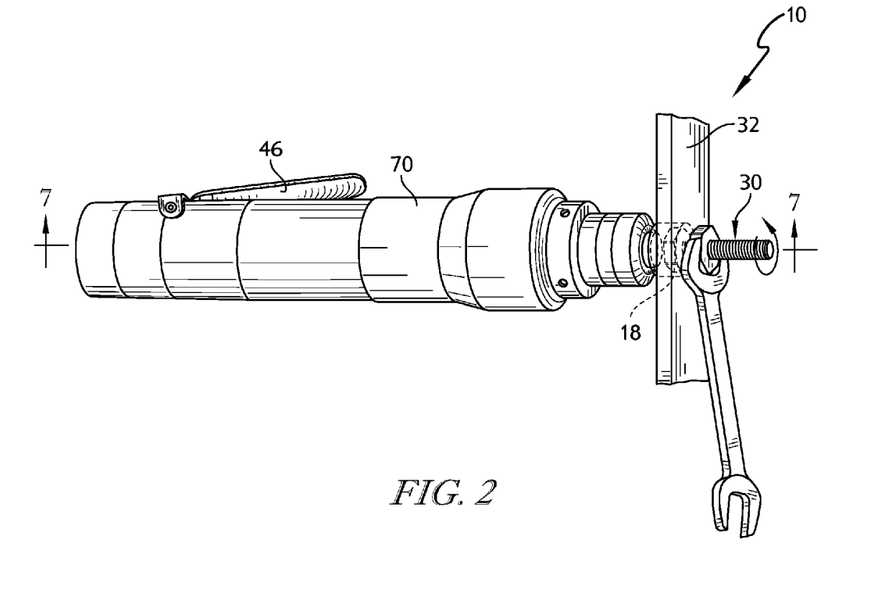
FIG. 2 is a perspective view of the power tool of FIG. 1 installing the fastener while operating in a low-speed, high-torque mode.

As such, the power tool 10 operates in a high-speed, low-torque mode during the run down phase, as illustrated in FIG. 1. During such operation, the power tool 10 drives the output shaft 14 at a relatively high rotational speed and the output shaft 14 is capable of applying a relatively low torque to the fastener 30. The high-speed, low-torque mode of the power tool 10 may be used to quickly rotate the fastener 30 during the run down phase to achieve a fast run down time. As described further below, the power tool 10 automatically self-shifts to operate in a low-speed, high-torque mode during the tightening phase, as illustrated in FIG. 2. During such operation, the power tool 10 drives the output shaft 14 at a relatively low rotational speed (i.e., slower than the relatively high rotational speed of the run down phase) and the output shaft 14 is capable of applying a relatively high torque (i.e., greater than the lower torque applied during the run down phase) to the fastener 30. The low-speed, high-torque mode of the power tool 10 may be used to rotate the fastener 30 during the tightening phase to achieve the desired final torque.

While FIGS. 1 and 2 generally illustrate the operation of the power tool 10 during installation of the fastener 30, the power tool 10 is also operable to automatically self-shift from the low-speed, high-torque mode (FIG. 2) to the high-speed, low-torque mode (FIG. 1) during removal of the fastener 30. For example, the low-speed, high-torque mode of the power tool 10 may be used to rotate and disengage the fastener 30 from the workpiece 32. After the power tool 10 automatically self-shifts, the high-speed, low-torque mode of may then be used to quickly rotate and remove the fastener 30 from the workpiece 32.

Figure 3:
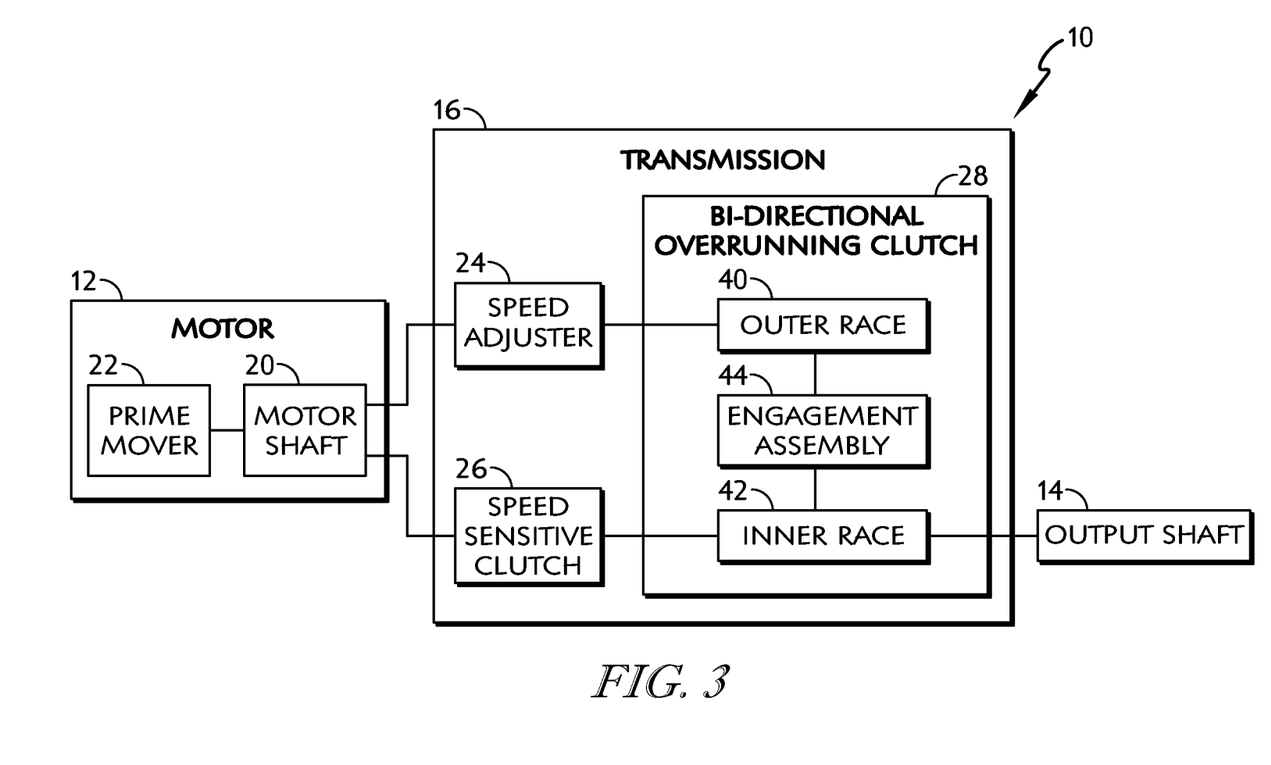
FIG. 3 is a simplified block diagram illustrating selected components of the power tool of FIG. 1.

Referring now to FIG. 3, the motor 12, the output shaft 14, and the transmission 16 of the power tool 10 are shown as a simplified block diagram. The motor 12 includes a motor shaft 20 and a prime mover 22 coupled to the motor shaft 20. The motor 12 may be illustratively embodied as an electric motor, a pneumatic motor, or any other suitable type of motor. The motor shaft 20 is configured to rotate about a motor axis 34, in either a clockwise direction or a counterclockwise direction when driven by the prime mover 22. The prime mover 22 rotates the motor shaft 20 about the motor axis 34 when energy (e.g., electric current or compressed air) is supplied to the prime mover 22.

Figure 4:
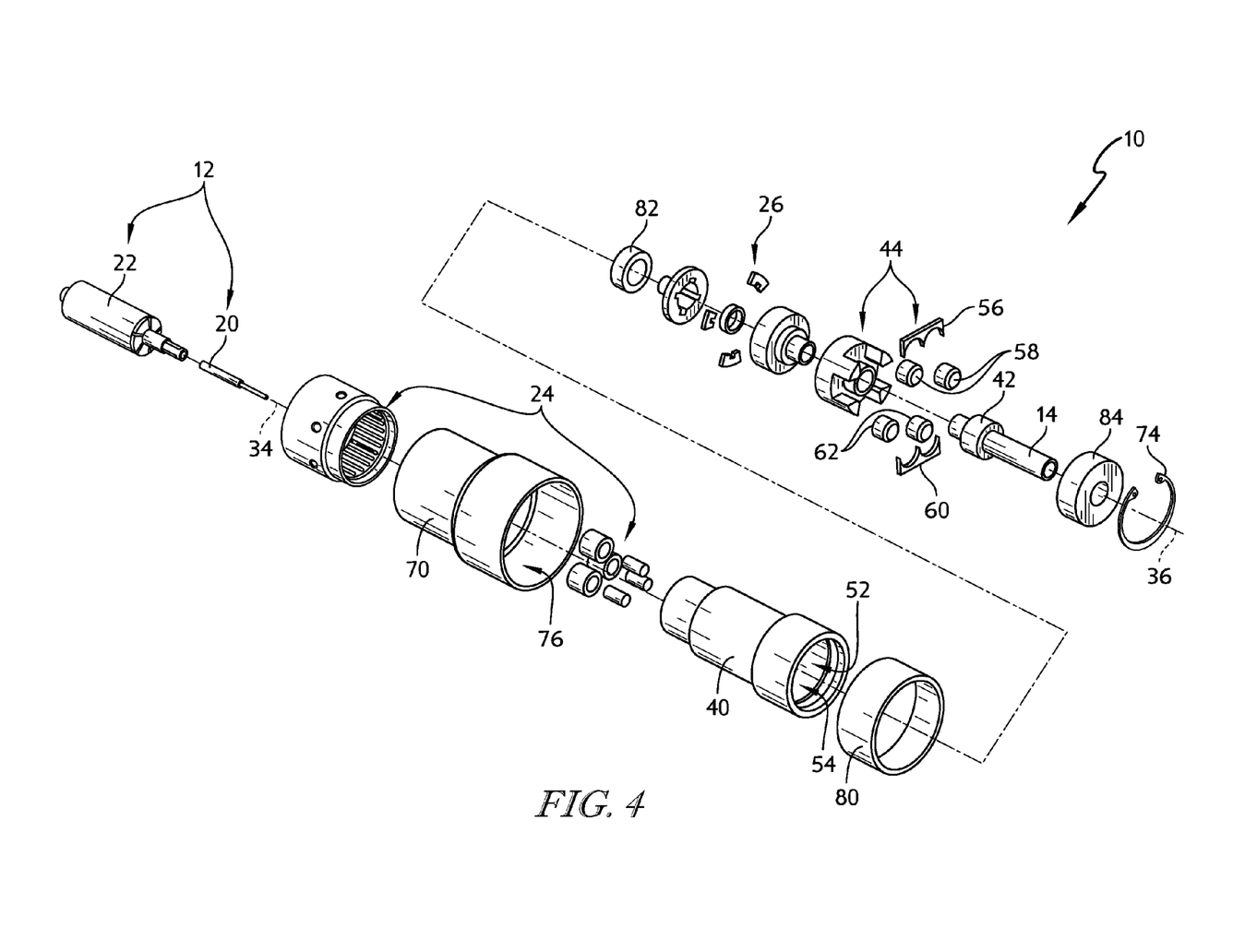
FIG. 4 is an exploded view of selected components of the power tool of FIG. 1.

The transmission 16 is coupled between the motor 12 and the output shaft 14. As such, the transmission 16 is operable to transfer rotation from the motor 12 to the output shaft 14 to cause the output shaft 14 to rotate in either a clockwise or counterclockwise direction (depending on the direction of rotation of the motor shaft 20). As described further below, the transmission 16 is configured to mechanically switch between the low-speed, high-torque mode and the high-speed, low-torque mode in response to a change in the torque required to rotate the output shaft 14 (in both the clockwise and counterclockwise direction). The output shaft 14 is coupled to the transmission 16 to transfer rotation from the transmission 16 to the fastener 30 (e.g., via the tool element 18). As shown in FIG. 4, the output shaft 14 is configured to rotate about an output axis 36. In the illustrative embodiment, the output axis 36 is collinear with the motor axis 34.

The transmission 16 includes a speed adjuster 24, a speed-sensitive clutch 26, and a bi-directional overrunning clutch 28. The bi-directional overrunning clutch 28 is coupled between the speed adjuster 24 and the output shaft 14 and between the speed-sensitive clutch 26 and the output shaft 14. The bi-directional overrunning clutch 28 is operable to transfer rotation from either the speed adjuster 24 or the speed-sensitive clutch 26 to the output shaft 14, depending on the mode in which the power tool 10 is operating. In particular, the bi-directional overrunning clutch 28 transfers rotation from the speed-sensitive clutch 26 to the output shaft 14 when the power tool 10 operates in the high-speed, low-torque mode, while the bi-directional overrunning clutch 28 transfers rotation from the speed adjuster 24 to the output shaft 14 when the power tool 10 operates in the low-speed, high-torque mode.

The bi-directional overrunning clutch 28 is operable to automatically self-shift from transferring rotation to the output shaft 14 from the speed-sensitive clutch 26 to transferring rotation to the output shaft 14 from the speed adjuster 24 when a resistance torque seen by the output shaft 14 becomes greater than a threshold torque. Similarly, the bi-directional overrunning clutch 28 is operable to automatically self-shift from transferring rotation to the output shaft 14 from the speed adjuster 24 to transferring rotation to the output shaft 14 from the speed-sensitive clutch 26 when the resistance torque seen by the output shaft 14 becomes less than or equal to the threshold torque. In other words, the bi-directional overrunning clutch 28 is configured to mechanically self-shift between the low-speed, high-torque mode and the high-speed, low-torque mode when the motor shaft 20 (and, hence, the output shaft 14) is rotating in either the clockwise direction or the counterclockwise direction.

In the illustrative embodiment shown in FIG. 3, the bi-directional overrunning clutch 28 includes an outer race 40, an inner race 42, and an engagement assembly 44. The outer race 40 is coupled to an output of the speed adjuster 24 for rotation therewith. The inner race 42 is coupled to an output of the speed-sensitive clutch 26. The output shaft 14 is also coupled to the inner race 42 for rotation therewith. The engagement assembly 44 is configured to selectively connect the inner race 42 to the outer race 40 for rotation therewith or disconnect the inner race 42 from the outer race 40 so that the inner race 42 can overrun the outer race 40 when the inner race 42 rotates faster than the outer race 40. When the inner race 42 is connected to the outer race 40, the engagement assembly 44 transfers rotation from the outer race 40 to the inner race 42 to cause the inner race 42 to rotate therewith. When the inner race 42 is disconnected from the outer race 40, the inner race 42 instead transfers rotation from speed-sensitive clutch 26 to the output shaft 14.

The speed adjuster 24 is coupled between the motor shaft 20 and the outer race 40 of the bi-directional overrunning clutch 28. The speed adjuster 24 changes the speed of rotation delivered to the outer race 40 (as compared to the speed of rotation of the motor shaft 20). In the illustrative embodiment, the speed adjuster 24 reduces the speed of rotation between the motor shaft 20 and the outer race 40 of the bi-directional overrunning clutch 28.

An input of the speed-sensitive clutch 26 is also coupled to the motor shaft 20, while an output of the speed-sensitive clutch 26 is coupled to the inner race 42 of the bi-directional overrunning clutch 28. When engaged (e.g., in the high-speed, low-torque mode), the speed-sensitive clutch 26 couples to the inner race 42 to the motor shaft 20 for rotation therewith. The speed adjuster 24 and the speed-sensitive clutch 26 are each configured to transfer rotation to the bi-directional overrunning clutch 28 in the same rotational direction. For example, if the speed-sensitive clutch 26 is transferring rotation to the bi-directional overrunning clutch 28 in the clockwise direction (while the power tool 10 operates in the high-speed, low-torque mode), the speed adjuster 24 will transfer rotation to the bi-directional overrunning clutch 28 in the clockwise direction (when the power tool 10 automatically self-shifts to the low-speed, high-torque mode). When a user reverses the direction of rotation of the motor shaft 20 (e.g., to remove a fastener 30), both the speed adjuster 24 and the speed-sensitive clutch 26 will transfer rotation to the bi-directional overrunning clutch 28 in the counterclockwise direction (depending on the mode in which the power tool 10 is operating).

In operation, a user may install a fastener 30 to the workpiece 32 with power tool 10 by first selecting the direction of rotation of the motor shaft 20 and, hence, the output shaft 14 (e.g., the clockwise direction). The user may then selectively supply energy to the prime mover 22 of the motor 12 of the power tool 10, for example, by depressing a trigger 46 of the power tool 10 (see FIGS. 1 and 2). This supplied energy will cause the prime mover 22 to rotate the motor shaft 20 in the selected rotational direction. The rotation of the motor shaft 20 is then transferred to the inputs of both the speed adjuster 24 and the speed-sensitive clutch 26. The speed adjuster 24 will transfer rotation to the outer race 40 of the bi-directional overrunning clutch 28 (at a rotational speed that is different than the rotational speed of the motor shaft 20).

The power tool 10 operates in the high-speed, low-torque mode when the rotational speed of the speed-sensitive clutch 26 is greater than a threshold speed (which corresponds to the resistance torque seen by the output shaft 14 being less than or equal to a threshold torque). In the high-speed, low-torque mode, the speed-sensitive clutch 26 transfers rotation to the inner race 42. Thus, the speed-sensitive clutch 26 causes the inner race 42 to rotate at a rotational speed (e.g., the rotational speed of the motor shaft 20) that is faster than the rotational speed of the outer race 40. The engagement assembly 44 disconnects the inner race 42 from the outer race 40 in response to the inner race 42 overrunning the outer race 40. As such, the output shaft 14 rotates with the inner race 42 at the faster rotational speed (allowing the fastener 30 to be run down in a shorter amount of time).

The power tool 10 self-shifts from the high-speed, low-torque mode to the low-speed, high-torque mode in response to a change in the output torque required to rotate the output shaft 14 (i.e., to overcome the resistance torque seen by the output shaft 14). When the resistance torque seen by the output shaft 14 exceeds a threshold torque, the rotational speed of the speed-sensitive clutch 26 will decrease below a threshold speed. As such, the speed-sensitive clutch 26 will disengage and cease transferring rotation to the inner race 42. The engagement assembly 44 will connect the inner race 42 to the outer race 40 in response to the inner race 42 no longer overrunning the outer race 40. With the engagement assembly 44 connects the inner race 42 and the outer race 40, the inner race 42 will rotate with the outer race 40 at the lower rotational speed provided to the outer race 40 by the output of the speed adjuster 24. As such, the output shaft 14 rotates with the outer race 40 and the inner race 42 at the lower rotational speed (providing higher-torque to the fastener 30).

An exploded view of selected components of one illustrative embodiment of the power tool 10 is shown in FIG. 4. As discussed above, the power tool 10 includes the motor 12, the output shaft 14, the transmission 16, the speed adjuster 24, and the speed-sensitive clutch 26. In this illustrative embodiment, the foregoing components are supported in a housing 70 of the power tool 10 by a number of bearings 80-84 and a snap ring 74.

In the illustrative embodiment, the motor 12 is a variable speed motor driven by a supply of compressed air (not shown). As described above, the motor 12 includes the prime mover 22 (e.g., a sliding vane rotor) and the motor shaft 20. As shown in FIG. 4, the speed adjuster 24 is illustratively embodied as a speed-reducing planetary gear set 24. In the illustrative embodiment, the motor shaft 20 includes a splined section that serves a sun gear of the speed-reducing planetary gear set 24, while a planetary gear carrier (illustratively coupled to three planetary gears) of the speed-reducing planetary gear set 24 is coupled to the outer race 40 of the bi-directional overrunning clutch 28. It will be appreciated that the configuration of the speed-reducing planetary gear set 24 shown in FIG. 4 serves to reduce the speed of rotation transferred to the outer race 40 of the bi-directional overrunning clutch 28 (as compared to the rotational speed of the motor shaft 20), while increasing the available torque.

As shown in FIG. 4, the speed-sensitive clutch 26 is illustratively embodied as a centrifugal clutch 26. The centrifugal clutch 26 is coupled between the motor shaft 20 and the bi-directional overrunning clutch 28 to transfer rotation from the motor shaft 20 to the inner race 42 of the bi-directional overrunning clutch 28 whenever the centrifugal clutch 26 is engaged. The centrifugal clutch 26 includes one or more masses that overcome a radially inward biasing force, when rotating above the threshold speed, to move radially outward and couple an input of the bi-directional overrunning clutch 28 to an output of the bi-directional overrunning clutch 28.

The bi-directional overrunning clutch 28 may be illustratively embodied any of the bi-directional overrunning clutches disclosed in U.S. patent application Ser. No. 14/023,691, filed Sep. 11, 2013, and entitled "Overrunning Clutches" (which is commonly-owned by the present applicant and is incorporated by reference herein in its entirety). As shown in FIG. 4, the bi-directional overrunning clutch 28 includes the outer race 40, the inner race 42, and the engagement assembly 44. The engagement assembly 44 is arranged in a space 52 defined radially between the outer race 40 and the inner race 42.

The outer race 40 is coupled to the output of the speed-reducing planetary gear set 24 (e.g., the planetary gear carrier) and configured to rotate about the output axis 36. In the illustrative embodiment, the outer race 40 defines an outer race cavity 54, which houses a portion of the motor shaft 20, the centrifugal clutch 26, the engagement assembly 44, and the inner race 42. The inner race 42 is coupled between the output of the centrifugal clutch 26 and the output shaft 14. In the illustrative embodiment, the inner race 42 and the output shaft 14 are formed as a monolithic component. The inner race 42 and the output shaft 14 are configured to rotate about the output axis 36 in either the clockwise or counterclockwise direction. In the illustrative embodiment, the motor shaft 20, the outer race 40, the inner race 42, and the output shaft 14 rotate about a common axis (i.e., the motor axis 34 and the output axis 36 are collinear). In other embodiments, the output shaft 14 may rotate about an output axis 36 that is non-parallel to the motor axis 34 (e.g., the motor axis 34 and the output axis 36 may be perpendicular).

In the illustrative embodiment shown in FIG. 4, the engagement assembly 44 of the bi-directional overrunning clutch 28 includes a first biasing shoe 56 and a first plurality of locking members 58 configured to move with the first biasing shoe 56 within the space 52 between an unlocked position, in which the locking members 58 are free to move relative to the outer race 40 and the inner race 42, and a locked position, in which the locking members 58 are wedged between the outer race 40 and the inner race 42 to couple the outer race 40 and the inner race 42 for rotation together. In the illustrative embodiment, the engagement assembly 44 further includes a second biasing shoe 60 and a second plurality of locking members 62. The second plurality of locking members 62 are configured to move with the second biasing shoe 60 within the space 52 between an unlocked position, in which the locking members 62 are free to move relative to the outer race 40 and the inner race 42, and a locked position, in which the locking members 62 are wedged between the outer race 40 and the inner race 42 to couple the outer race 40 and the inner race 42 for rotation together. In the illustrative embodiment shown in FIG. 4, the first and second biasing shoes 56, 60 are each be frictionally engaged with the outer race 40, and the locking members 58, 62 are embodied as rollers. Other possible illustrative embodiments of the engagement assembly 44 of the bi-directional overrunning clutch 28 are described and shown in detail in U.S. patent application Ser. No. 14/023,691 (incorporated by reference above)

Figure 5:
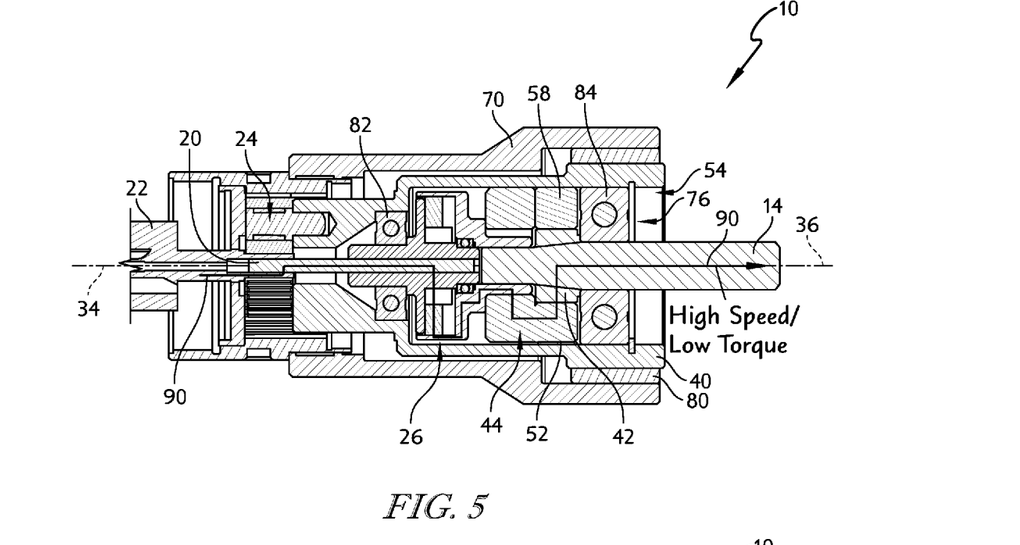
FIG. 5 is a sectional view taken along line 5-5 of FIG. 1, showing a rotation transfer path while the power tool operates in the high-speed, low-torque mode.
Figure 6:
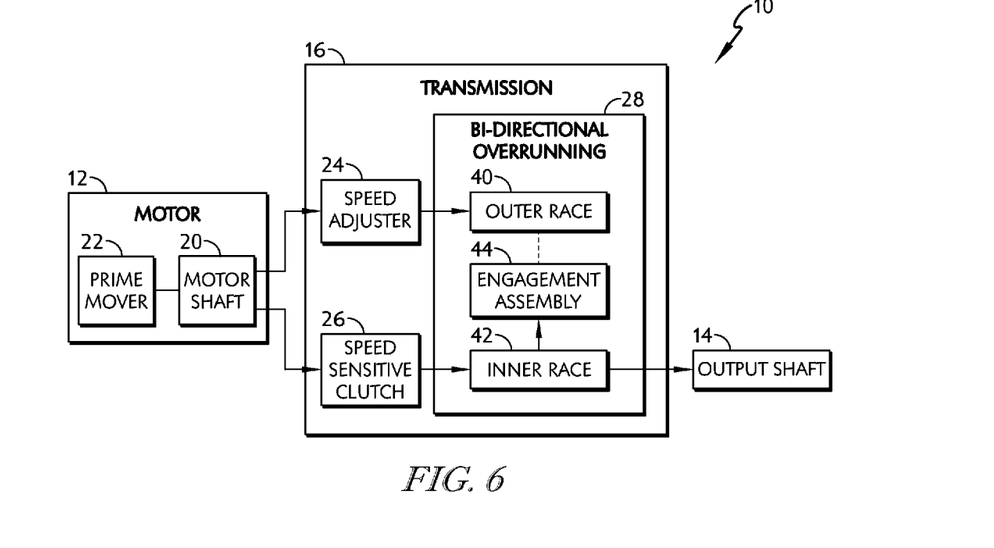
FIG. 6 is a simplified block diagram illustrating the rotation transfer path while the power tool operates in the high-speed, low-torque mode.

When the power tool 10 operates in the high-speed, low-torque mode, rotation is transferred from the motor shaft 20 through the centrifugal clutch 26 and the bi-directional overrunning clutch 28 to the output shaft 14, as indicated by the rotation transfer path 90 shown in FIGS. 5 and 6. In particular, the centrifugal clutch 26 engages to transfer rotation from the motor shaft 20 to the inner race 42. As such, the transmission 16 drives the output shaft 14 at a relatively high rotational speed (e.g., the rotational speed of the motor shaft 20). As described above, when the power tool 10 is in this mode of operation, rotation is also transferred from the motor shaft 20 through the speed-reducing planetary gear set 24 to the outer race 40 of the bi-directional overrunning clutch 28. However, because the inner race 42 rotates at a relatively higher speed than the outer race 40 in this mode, the engagement assembly 44 remains in an unlocked position (as indicated by the dashed line between the outer race 40 and the engagement assembly 44 in FIG. 6), and the inner race 42 overruns the outer race 40.

Figure 7:
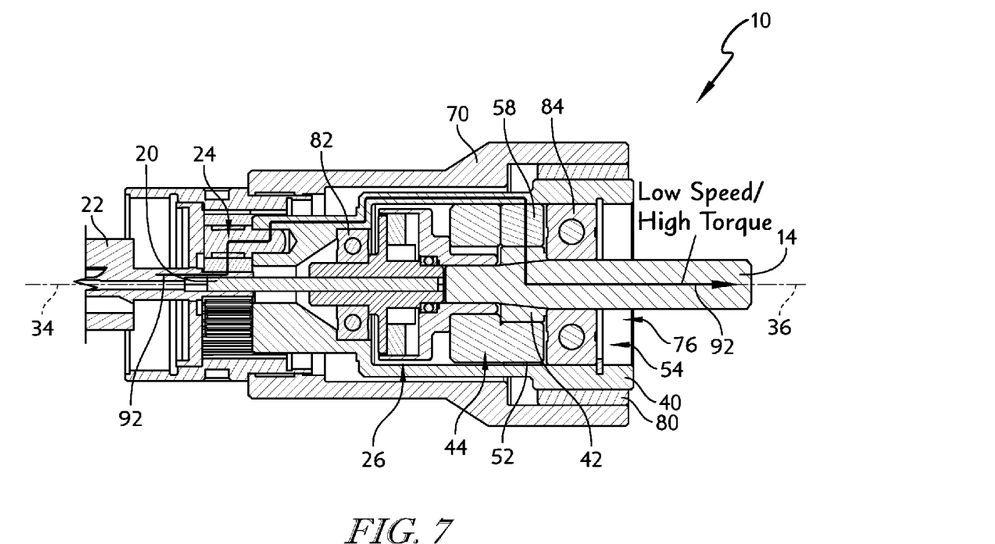
FIG. 7 is a sectional view taken along line 7-7 of FIG. 2, showing a rotation transfer path while the power tool operates in the low-speed, high-torque mode.
Figure 8:
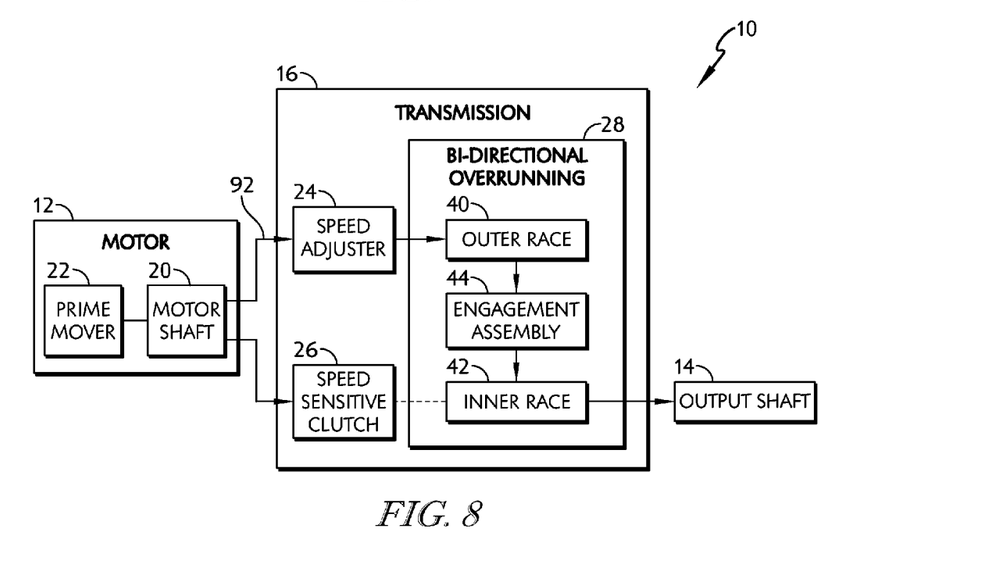
FIG. 8 is a simplified block diagram illustrating the rotation transfer path while the power tool operates in the low-speed, high-torque mode.

When the power tool 10 operates in the low-speed, high-torque mode, rotation is transferred from the motor shaft 20 through the speed-reducing planetary gear set 24 and the bi-directional overrunning clutch 28 to the output shaft 14, as indicated by the rotation transfer path 92 shown in FIGS. 7 and 8. In particular, the centrifugal clutch 26 disengages (as indicated by the dashed line between the speed-sensitive clutch 26 and the inner race 42 in FIG. 8), such that rotation is of the inner race 42 is not driven directly by the motor shaft 20. Instead, the engagement assembly 44 moves to a locked position (e.g., via friction between the outer race 40 and the biasing shoes 56, 60) to connect the inner race 42 to the outer race 40. With the inner race 42 connected to the outer race 40 in this mode, the inner race 42 rotates with the outer race 40 to transfer rotation to the output shaft 14 at the relatively slower rotational speed of the outer race 40.

As mentioned above, the power tool 10 additionally includes the housing 70 configured to enclose the transmission 16, the bearings 80-84, and the snap ring 74, as suggested in FIG. 4. The housing 70 is formed to define a housing cavity 76 that houses at least a portion of the transmission 16. An outer race bearing 80 is coupled to the outer race 40 and the housing 70. The outer race bearing 80 is configured to support the outer race 40, while allowing the outer race 40 to rotate relative to the housing 70. A centrifugal clutch bearing 82 is coupled to the centrifugal clutch 26 and the outer race 40. The centrifugal clutch bearing 82 is configured to support the centrifugal clutch 26, while allowing the centrifugal clutch 26 to rotate relative to the outer race 40. An output shaft bearing 84 is coupled to the output shaft 14 and the outer race 40. The output shaft bearing 84 is configured to support the output shaft 14, while allowing the output shaft 14 to rotate relative to the outer race 40. The snap ring 74 may be located inside the outer race cavity 54 and may abut the output shaft bearing 84. The snap ring 74 is configured to block axial movement of the components of the transmission 16 to hold the components in the outer race cavity 54.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present disclosure.

The invention claimed is:

1. A power tool comprising:
   a motor having a motor shaft;
   an output shaft configured to be coupled to a fastener to rotate the fastener; and
   a transmission coupled between the motor shaft and the output shaft to transmit rotation from the motor shaft to the output shaft in a low-speed, high-torque mode and in a high-speed, low-torque mode, wherein the transmission is configured to self-shift between the low-speed, high-torque mode and the high-speed, low-torque mode in response to a change in a torque required to rotate the output shaft in both a clockwise direction and a counterclockwise direction.

2. The power tool of claim 1, wherein the transmission comprises a speed adjuster coupled to the motor shaft, a speed-sensitive clutch coupled to the motor shaft, and a bi-directional overrunning clutch coupled between the speed adjuster and the output shaft.

3. The power tool of claim 2, wherein the bi-directional overrunning clutch is also coupled between the speed-sensitive clutch and the output shaft.

4. The power tool of claim 2, wherein the transmission is configured such that, when the transmission is in the high-speed, low-torque mode, the speed-sensitive clutch couples to the bi-directional overrunning clutch to transfer rotation from the motor shaft to the bi-directional overrunning clutch for rotation therewith.

5. The power tool of claim 2, wherein the speed-sensitive clutch is a centrifugal clutch.

6. The power tool of claim 5, wherein the centrifugal clutch is configured to overcome a biasing force when rotating above a threshold speed to couple to the bi-directional overrunning clutch.

7. The power tool of claim 2, wherein the speed adjuster is configured to reduce a speed of rotation transferred from the motor shaft to the bi-directional overrunning clutch.

8. The power tool of claim 7, wherein the speed adjuster is a speed-reducing planetary gear set.

9. The power tool of claim 2, wherein the bi-directional overrunning clutch comprises an outer race coupled to the speed adjuster, an inner race coupled to the speed-sensitive clutch, and an engagement assembly located in a space defined radially between the outer race and the inner race.

10. The power tool of claim 9, wherein the engagement assembly is configured to selectively (i) connect the inner race to the outer race for rotation therewith or (ii) disconnect the inner race from the outer race so that the inner race can overrun the outer race when the inner race rotates faster than the outer race.

11. The power tool of claim 9, wherein the output shaft is coupled to the inner race for rotation therewith.

12. The power tool of claim 9, wherein the outer race is formed to define an outer race cavity that houses the speed-sensitive clutch.

13. The power tool of claim 9, wherein the motor shaft, the outer race, the inner race, and the output shaft each rotate about a common axis.

14. A power tool transmission comprising:
    an output shaft;
    a centrifugal clutch;
    a speed-reduction gear set; and
    a bi-directional overrunning clutch coupled between the centrifugal clutch and the output shaft and coupled between the speed-reduction gear set and the output shaft.

15. The power tool transmission of claim 14, wherein the bi-directional overrunning clutch comprises an outer race coupled to an output of the speed-reduction gear set, an inner race coupled to an output of the centrifugal clutch, and an engagement assembly located in a space defined radially between the outer race and the inner race.

16. The power tool transmission of claim 15, wherein the engagement assembly is movable between an unlocked position, in which the inner race is free to move relative to the outer race in both a clockwise direction and a counterclockwise direction, and a locked position, in which the engagement assembly is wedged between the outer race and the inner race to couple the outer race to the inner race for rotation therewith in both the clockwise direction and the counterclockwise direction.

17. The power tool transmission of claim 15, wherein the output shaft is coupled to the inner race for rotation therewith.

18. The power tool transmission of claim 15, wherein the engagement assembly comprises a first biasing shoe frictionally engaged with the outer race and a first plurality of locking members configured to move with the first biasing shoe within the space between an unlocked position, in which the first plurality of locking members are free to move relative to the outer race and the inner race, and a locked position, in which the first plurality of locking members are wedged between the outer race and the inner race to couple the outer race to the inner race for rotation therewith.

19. The power tool transmission of claim 18, wherein the engagement assembly further comprises a second biasing shoe frictionally engaged with the outer race and a second plurality of locking members configured to move with the second biasing shoe within the space between an unlocked position, in which the second plurality of locking members are free to move relative to the outer race and the inner race, and a locked position, in which the second plurality of locking members are wedged between the outer race and the inner race to couple the outer race to the inner race for rotation therewith.

20. The power tool transmission of claim 18, wherein the first plurality of locking members is a plurality of rollers.

* * * * *